United States Patent
Cattaneo et al.

(10) Patent No.: US 6,950,231 B2
(45) Date of Patent: Sep. 27, 2005

(54) PROCESS FOR GENERATING AN OPTICAL RADIATION, CORRESPONDING SOURCE AND RAMAN AMPLIFIER INCLUDING SUCH A SOURCE

(75) Inventors: Stefano Cattaneo, Milan (IT); Stefano Cecchi, Prato (IT)

(73) Assignee: IPG Fibertech S.r.l., Legnano (IT)

( * ) Notice: Subject to any disclaimer, the term of this patent is extended or adjusted under 35 U.S.C. 154(b) by 1 day.

(21) Appl. No.: 10/260,221

(22) Filed: Sep. 27, 2002

(65) Prior Publication Data

US 2003/0090778 A1 May 15, 2003

(51) Int. Cl.⁷ .................................................. H01S 3/00
(52) U.S. Cl. ...................................................... 359/334
(58) Field of Search .............................. 359/341.3, 334

(56) References Cited

U.S. PATENT DOCUMENTS 6,480,326 B2 * 11/2002 Papernyi et al. ............ 359/334
6,631,025 B2 * 10/2003 Islam et al. .................. 359/334
6,639,715 B2 * 10/2003 Naito et al. .................. 359/334

* cited by examiner

*Primary Examiner*—Mark Hellner
(74) *Attorney, Agent, or Firm*—Dorsey & Whitney LLP

(57) ABSTRACT

An optical radiation adapted for use in Raman amplification in a given band, is generated from a low power optical radiation with a respective bandwidth, generated by a plurality of master oscillators, such as low-power laser diodes whose output radiation is multiplexed by a multiplexer. A Raman amplification medium is provided, such as a length of optical fiber, and an additional optical radiation adapted for use in Raman amplification in said Raman amplification medium is generated. Both the low-power optical radiation and the additional optical radiation are injected into the medium so to produce, by the Raman effect induced in the medium, the output optical radiation.

22 Claims, 1 Drawing Sheet

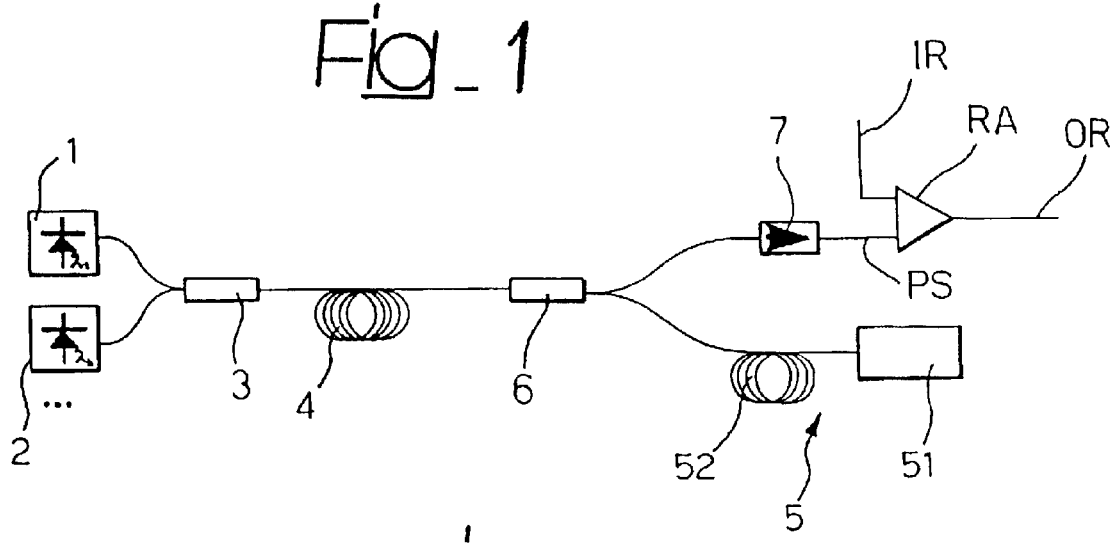
Fig_1
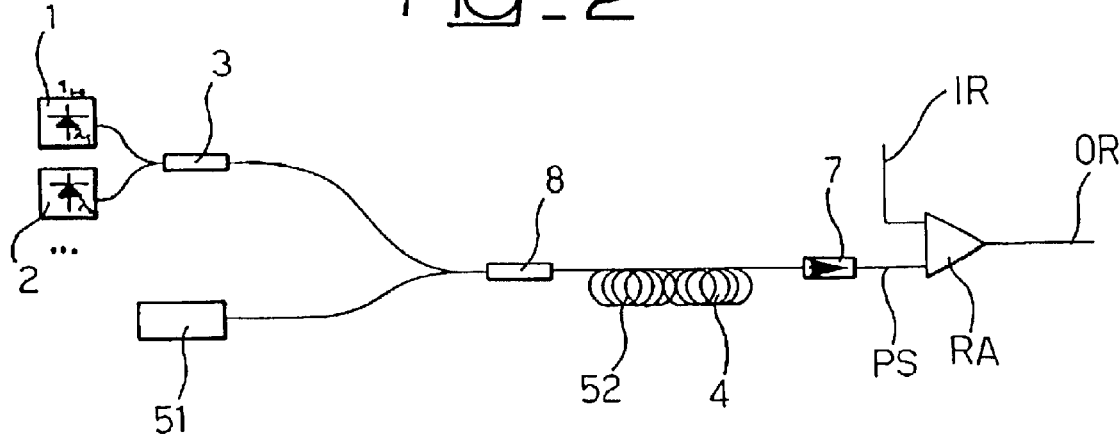
Fig_2
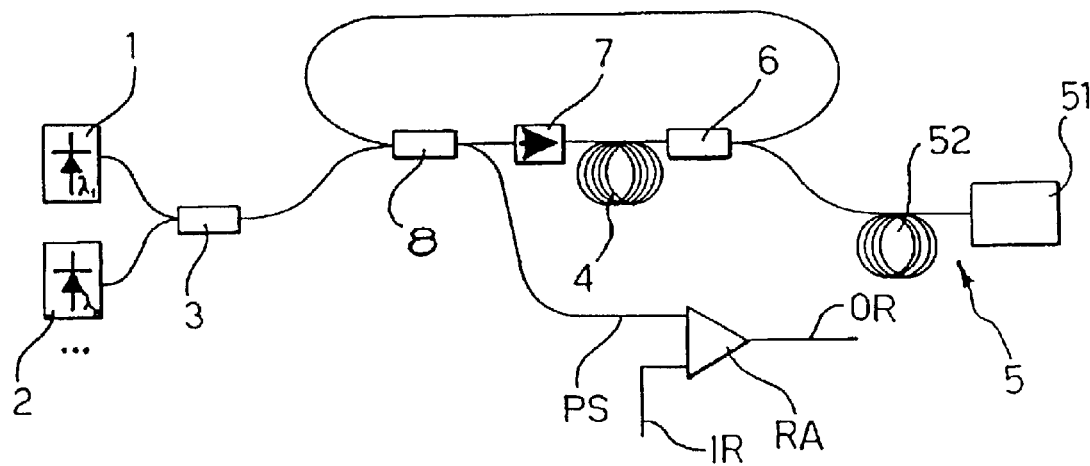
Fig_3

PROCESS FOR GENERATING AN OPTICAL RADIATION, CORRESPONDING SOURCE AND RAMAN AMPLIFIER INCLUDING SUCH A SOURCE

CROSS REFERENCE TO RELATED APPLICATIONS

In accordance with 35 U.S.C. § 119, this application claims priority to EPO Application Number 01830618.3, filed on Sep. 28, 2001, entitled "A PROCESS FOR GENERATING AN OPTICAL RADIATION, CORRESPONDING SOURCE AND RAMAN AMPLIFIER INCLUDING SUCH A SOURCE," which is hereby incorporated by reference in its entirety as if fully disclosed herein.

BACKGROUND OF THE INVENTION

1. Field of the Invention

This invention relates to amplification techniques based on the Raman effect and was developed with particular reference to the need of developing broadband and high-power laser sources which can be used in Raman amplifiers for amplifying optical signals on fibers.

2. Description of Background Art

In fiber optic transmission systems, the continuous growth in transmission bandwidth requirements has pushed research activities in two main directions: increasing the signal frequency (bit rate) and increasing the number of channels adapted to be multiplexed in WDM and DWDM systems.

In this scenario, Raman amplification techniques (both distributed and discrete) play an increasingly important role in overcoming the intrinsic limitations of traditional systems based, for example, on Erbium Doped Fiber Amplifiers (EDFA). In principle, this also refers to the aspects related to bandwidth and noise. Additionally, Raman amplification can be useful for eliminating or compensating EDFA gain irregularities (tilting and/or ripples) due to the presence of optical amplifiers (EDFA) in the transmission line.

For a general overview of Raman amplification techniques, useful reference can be made to the following works: Alan Evans, "Raman Amplification in Broadband WDM Systems," OFC 2001, TuF4-1; M. D. Marmelstein, et al., "A High Efficiency Power-Stabile Three-Wavelength Configurable Raman Fiber Laser," OFC 2001, PD3-1; Do Il Chang, et al., "Dual-Wavelength Cascaded Raman Fiber Laser," OFC 2001, MA6-1.

The frequency/wavelength range in which the amplification effect is attained is identified in principle by the frequency of the source used as a pump. Consequently, in order to extend the frequency range for Raman amplification and to make the amplification action more regular in this frequency range, pumping with several sources working at different wavelengths can be resorted to. Each source consequently generates radiation at a wavelength suitable for producing a Raman gain in a different region of the electromagnetic spectrum. To fulfill the above requirement, it is mandatory to pump the medium in which the Raman effect is attained (hereinafter briefly called the "Raman medium") by using several pump wavelengths with suitable power levels. The objective is to approximate as closely as possible the ideal model of a single high-power source capable of generating a broadband output signal and preferably offering the possibility of implementing reliable control, both of the output power and of the wavelength in each frequency range concerned.

With reference to this, techniques based on the solution of wavelength and polarisation multiplexing of the outputs of several low-power pump laser diodes were recently proposed to provide Raman gain over an adequately broad bandwidth.

These solutions are documented, for example, in the works by Y. Emori, et al., "1-THz-Spaced Multi-Wavelength Pumping for Broadband Raman Amplifiers," ECOC 2000, Dienstag 4.4.2 and by Y. Emori, S. Namiki, "1000 nm Bandwidth Flat Gain Raman Amplifiers Pumped and Gain-Equalised by 12-Wavelength Channel WDM High-Power Laser Diodes," OFC 1999, Pd19-1.

These solutions are essentially based on the principle of multiplexing a sufficiently high number of narrowband sources, i.e. sources whose output spectrum, in the wavelength range, has a width which is typically lower than one nanometre. The main drawbacks of these solutions are essentially related to system reliability (penalised by the need of using a high number of sources and respective coupling components) and to the fact that output power is however rather low, also due to intrinsic losses related to multiplexing operations of the radiation generated by the single sources.

Noise of the pump sources is another crucial factor which must be considered in Raman fiber amplifier design. This fact (described, for example, in the work by C. R. S. Fludger, et al., "Pump to Signal RIN Transfer in Raman Fiber Amplifiers", El. Lett. Vol. 37, No. 1, pg. 15-17, Jan. 4, 2001) along with cost and dimension factors penalises both the solutions described above and other recently proposed solutions based on multiplexing two or more Raman fiber lasers.

SUMMARY OF THE INVENTION

The present invention provides a solution for making a broadband, low noise and high power laser source for use as a pumping source for a Raman fiber amplifier, presenting broadband operation and high amplification gain. The invention may be practiced in both distributed and discrete configurations, both of which are more thoroughly described below.

Generally, optical radiation for use in Raman amplification in a given energy band may be generated by the present invention. A low-power optical radiation with a respective bandwidth is produced by the invention. The low-power optical radiation is injected into a Raman medium along with additional optical radiation adapted for use in a Raman medium, which may also be generated by the present invention. The action of injecting the low-power and additional optical radiations into the Raman amplification medium produces optical radiation adapted for use in Raman amplification, due to the Raman effect induced in the Raman medium. Generally, the Raman medium may take the form of any medium capable of producing a Raman amplification effect.

According to this invention, this object is achieved by a process whose characteristics are specifically recited in the accompanying claims. This invention also relates to the corresponding source and to a Raman amplifier implementing said source.

BRIEF DESCRIPTION OF THE FIGURES

FIG. 1 displays a first embodiment of a broadband, low noise, high power laser radiation source.

FIG. 2 displays a second embodiment of a broadband, low noise, high power laser radiation source.

FIG. 3 displays a third embodiment of a broadband, low noise, high power laser radiation source.

DETAILED DESCRIPTION OF THE INVENTION

This invention will now be described, by way of example only, by referring to the accompanying drawings, comprising three figures, indicated as FIG. 1, FIG. 2 and FIG. 3, respectively. The figures illustrate three different possible embodiments of a broadband, low noise and high-power laser radiation source, made according to this invention.

In all three possible embodiments illustrated in the accompanying drawings (which do not comprehensively include all the various possible embodiments of this invention), reference PS indicates a broadband, high power laser signal. Specifically, the PS signal can be used as a pumping signal in a Raman effect amplifier RA inserted in a fiber optic signal transmission system to generate an amplified output signal OR from an input signal IR.

To help comprehension, without limiting the scope of this invention, the pumping signal PS can be a signal with a bandwidth of several tens of nanometers (e.g. in the range from 1420 to 1500 nanometres) with a power in the order of 1–3 watts.

In any case, due to the substantial modularity criterion by which the signal PS is generated (according to the criteria better described below), said bandwidth and power criteria can be selectively increased or decreased according to the specific requirements of use.

As concerns the power of the PS radiation, it must be considered that the possibility of obtaining an efficient Raman amplification effect in the amplifier RA gradually decreases as the radiation power PS decreases to become barely appreciable at powers under 180–200 mW.

In any case, the general construction characteristics of the Raman amplifier RA (either in distributed configuration or discrete configuration) are intrinsically known in technology and however not essential for understanding this implementation.

In all three embodiments illustrated in the drawings, the radiation PS is generated by a plurality of laser sources consisting of laser diodes 1, 2, . . . , n operating as master oscillators in a general MOPA (Master Oscillator+Power Amplifier) configuration.

Any number of laser diodes operating as master oscillators can be used. The accompanying drawings show two diodes 1, 2. This is because the experiments carried out by the Applicant have demonstrated that this generally simple solution generates a pumping radiation PS with a bandwidth satisfying numerous practical applications.

In essential terms, the diodes 1, 2 can consist of currently manufactured low-power laser diodes, e.g. FiTel FOL1402PMH-317-14XX or Sumitomo SLA5604-CD components.

The diodes 1 and 2 are herein identified as "low power" optical sources to indicate that the radiation individually output by each of the sources would singularly be insufficient to generate an appreciable Raman effect if injected in a corresponding medium.

To help comprehension, always as a non-limiting example, the concerned diodes 1, 2 can present an output power in the order of 150–180 mW, and in a way which is particularly advantageous (for the reasons which will be clarified below) the output power is selectively adjustable for each of the diodes 1, 2.

For example, diodes 1, 2, . . . can present an output bandwidth in the order of 2–3 nanometres and, preferably, in the order of approximately 10 nanometres.

In all three FIGS. 1 to 3, numeral 3 refers to an optical multiplexer used to multiplex according to a general WDM or polarisation configuration the radiation generated by sources 1 or 2, which are preferably selected to occupy different and adjacent frequency bands.

The overall result of the action performed by the multiplexer is to produce a combined radiation from the multiplexer 3 output whose bandwidth is approximately equal to the sum of the bandwidths of the single sources 1, 2.

For example, the multiplexer 3 can output a radiation with a bandwidth in the range from 4–6 nanometres to approximately 20 nanometres by using two sources 1 and 2 with the bandwidth characteristics described above. These values can be further increased by increasing the number of the master sources 1, 2, etc.

It appears immediately that, for example, a bandwidth of 20 nanometres—which can be generated according to this invention also by using only two sources 1, 2,—in traditional solutions based on bandforming using a plurality of narrowband sources (bandwidth in the order of one nanometre or less) requires a much higher number of sources to be multiplexed according to a general comb-like configuration.

Numeral 4 generally indicates a Raman medium, i.e. any medium which is capable of producing a Raman amplification effect.

In the currently preferred embodiment, the Raman medium 4 simply consists of a length of a single-mode fiber of a known type.

In FIGS. 1 to 3, numerical reference 5 generally indicates a source of radiation which can be used as a pumping source to generate in the medium 4 Raman amplification of the radiation obtained by multiplexing the radiation generated by diodes 1 and 2 in the optical multiplexer 3.

The source 5 can, for example, consist of a laser source with an output power in the order of 2–3 watts working, for example, at a wavelength in the order of the 1360–1400 nanometres.

The source 5 does not need to present particular characteristics in terms of bandwidth.

The amplified signal generated by the Raman effect in the medium 4 presents, on the one hand, a power essentially identified by the power of the pump source 5 (consequently in the range of 2–3 watts) and, on the other hand, a bandwidth which is the bandwidth of the signal generated by the multiplexer 3.

In a currently preferred embodiment, also the source 5 exploits the Raman effect and consequently consists of a laser source 51, such as a Ytterbium Fiber Laser (YFL) outputting, for example, in the range of 1100 nm, associated with a cascaded Raman medium 52, also consisting of a length of single-mode optical fiber acting as a cascaded Raman converter.

It will be appreciated that the various embodiments illustrated in FIGS. 1 to 3 differ essentially for the method with which the pump radiation generated in the source 5 is injected in the Raman medium 4.

The embodiment in FIG. 1 employs an optical coupler 6 (of a known type) which, on the one hand, is used to inject into the medium 4 the pump radiation generated by the source 5 and, on the other hand, separates the amplified radiation, which is generated in the Raman medium 4, splitting it out so that it can be sent to the input of the Raman amplifier RA, and possibly made to propagate through an optical isolator 7 so to improve stability.

The variant embodiment shown in FIG. 2 is characterised for its very simple construction.

In this case, the radiation from the source 51 is multiplexed in a multiplexer indicated with numeral 8 with the broadband radiation from the multiplexer 3. The composite radiation thus obtained is injected into a length of fiber acting as a Raman medium which is capable of incorporating the function of both Raman media indicated with numeral 52 above (i.e. cascaded Raman converter for amplifying the pump radiation from the source 51) and 4 (i.e. Raman amplification of the signals from the laser diodes 1 and 2).

The configuration in FIG. 3 illustrates an additional embodiment of this invention which can be used when the specifications in terms of noise are not particularly stringent, for example when the source according to this invention is used as a counterpropagating pump on the transmission line.

Conceptually, the configuration in FIG. 3 is a variation of that in FIG. 1 with a splitter 8 inserted downstream of the optical coupler 6 for splitting the radiation from the coupler 6 in a fixed proportion.

The coupler 6 receives the pump radiation from the source 5 by also splitting the component corresponding to the amplification of the signals from the laser diodes 1 and 2.

Unlike the configuration in FIG. 1, where the signal component is sent to the output of the source, i.e. to the Raman amplifier RA, in FIG. 3 a part of the component is returned, via component 8, to the input of the Raman medium 4, propagating through the optical isolator 7.

The component 8, located upstream of the Raman medium 4, ensures that part of the radiation from the coupler 6 is sent to the Raman amplifier RA, while the remaining part circulates in the loop. A similar principle applies to the radiation generated by sources 1 and 2, which propagates through the splitter 8 to be split into a first part going directly to the amplifier RA and a second part which goes to the loop.

It will be appreciated that operation of all three configurations in figures from 1 to 3 is based on the different frequency location of the radiation output by the laser diodes 1 and 2 (typically comprised in the range from 1420 to 1500 nanometres) and of the pump radiation from the source 5, localised typically around a wavelength of 1390 nanometres. Particularly, it will be appreciated that the radiation output by the ytterbium fiber laser such as the laser 51 is localised in the wavelength of 1100 nanometres, the conversion to the value shown above being the effect of the presence of the Raman medium 52.

Essentially, the solution according to this invention is based on the fact that the signals generated by laser diodes 1 and 2, operating as master oscillators, are multiplexed into the single-mode fiber 4 where amplification is obtained. In this way, the energy from the pump 5 is distributed on the various signals of the master oscillators according to the respective input power.

By selectively adjusting the output power from each of the laser diodes 1, 2, . . . , the corresponding intensity of the pump signal PS in the corresponding spectral window can be varied. In addition to this, the output frequencies of the sources 1 and 2 can be varied at least marginally by varying, for example, the respective junction temperature, determining a corresponding variation of the respective portion of the pump signal PS.

As a result, the spectrum of the pump single PS can be selectively modified. This spectrum results from juxtaposing the output spectrums of the laser diodes 1 and 2 subjected to amplification by Raman effect in the medium 4. In this way, a power radiation PS sufficient in turn to trigger a Raman amplification effect in the Raman amplifier (in the distributed or discrete configuration, according to needs) is output.

Naturally, numerous changes can be implemented to the construction and embodiments of the invention herein envisaged, without departing from the scope of the invention, as defined by the following claims. Specifically, it will be appreciated that the terms optic/optical used in this description and, where relevant in the following claims, is applied, according to current practice, also for example to infrared and, in general, to all radiation ranges which can be used for the transmission of signals according to the methods extensively described herein, and not only to the radiation comprising the range of visible light, as appears obvious in the repeated quantitative examples mentioned in this description.

What is claimed is:

1. A process for generating an optical radiation adapted for use in Reman amplification in a given band, the process comprising the following operations:

generating, by a source, a low-power optical radiation with a respective bandwidth, providing a Raman medium operatively located between the source and a Raman amplifier, generating an additional optical radiation adapted for use in Raman amplification in said Raman medium, injecting said low-power optical radiation and said additional optical radiation into said Raman medium so to produce said optical radiation adapted for use in Raman amplification in said band thanks to the Raman effect induced in said Raman medium, wherein the operation of generating said additional optical radiation comprises:

providing an additional Raman medium and generating an optical power radiation adapted to be converted by Raman effect in said additional Raman medium.

2. The process according to claim 1, comprising the operation of providing a plurality of sources for generating respective low-power optical radiation in respective bands which are reciprocally distinct and adjacent and the operation of multiplexing said respective optical radiation so to generate said low power optical radiation.

3. The process according to claim 1, wherein said Raman medium is provided in the form of a length of optical fiber.

4. The process according to claim 1 comprising the following operations for generating said additional optical radiation:

providing an additional Raman medium and generating an optical power radiation adapted to be converted by Raman effect in said additional Raman medium.

5. The process according to claim 4, wherein said optical power radiation is generated by a ytterbium fiber laser.

6. The process according to claim 4, wherein said additional Raman medium is provided in the form of a length of optical fiber.

7. The process according to claim 4, wherein said Raman medium and said additional Raman medium are arranged in a cascaded configuration.

8. The process according to claim 4 wherein said Raman medium and said additional Raman medium are provided in the form of a single length of optical fiber.

9. The process according to claim 1 comprising the operation of returning, at least in part, said low power radiation and said additional radiation to the Raman medium input, according to a general circulation configuration.

10. The process according to claim 9, comprising the operation of splitting part of said optical radiation adapted for use in Raman amplification out of said circulation loop in correspondence of the point in which said low-power optical radiation is injected into said Raman medium.

11. The source according to claim 1, wherein said Raman medium is arranged in an circulation loop in which said low-power optical radiation and said additional optical radiation are taken, at least in part, from the output of said circulation loop downstream of said Raman medium and returned to the input of the Raman medium itself.

12. The source according to claim 11, comprising a module for splitting part of said optical radiation adapted for use in Raman amplification out of said circulation loop in correspondence of the point in which said low-power optical radiation is injected into said Raman medium.

13. A source for generating an optical radiation adapted for use in Raman amplification in a given band, comprising:

at least one source for generating a low-power optical radiation with a respective bandwidth, a Raman medium operatively located between the source and a Raman amplifier, a generator of an additional optical radiation adapted for use in Raman amplification in said Raman medium, at least one coupling module for injecting said low-power optical radiation and said additional optical radiation into said Raman medium so to produce said optical radiation adapted for use in Raman amplification in said given band thanks to the Raman effect induced in said Raman medium, wherein said generator of said additional optical radiation comprises:
an additional Raman medium; and
a module for generating an optical power radiation adapted to be converted by Raman effect in said additional Raman medium.

14. The source according to claim 13, comprising a plurality of sources for generating respective low power optical radiation in respective bands which are reciprocally distinct and adjacent and a multiplexer for multiplexing said respective optical radiation so to generate said low-power optical radiation.

15. The source according to claim 13, wherein said Raman medium is provided in the form of a length of optical fiber.

16. The source according to claim 13, wherein said generator for generating said additional optical radiation comprises:
an additional Raman medium; and
a module for generating an optical power radiation adapted to be converted by Raman effect in said additional Raman medium.

17. The source according to claim 16, wherein said module is a ytterbium fiber laser module.

18. The source according to claim 16, wherein said additional Raman medium is provided in the form of a length of optical fiber.

19. The source according to claim 16, wherein said Raman medium and said additional Raman medium are arranged in a cascaded configuration.

20. The source according to claim 16 wherein said Raman medium and said additional Raman medium are provided in the form of a single length of optical fiber.

21. A Raman effect optical signal amplifier in distributed configuration with an associated pump source according to claim 11.

22. A Raman effect optical signal amplifier in discrete configuration with an associated pump source according to claim 11.

* * * * *

UNITED STATES PATENT AND TRADEMARK OFFICE
CERTIFICATE OF CORRECTION

PATENT NO. : 6,950,231 B2
DATED : September 27, 2005
INVENTOR(S) : Stefano Cattaneo and Stefano Cecchi It is certified that error appears in the above-identified patent and that said Letters Patent is hereby corrected as shown below:

Title page,
Insert Item -- [30] Foreign Application Priority Data
09/28/2001 (EPO) 01830618.3 --.

Column 6,
Line 21, delete "Reman" and insert -- Raman --.
Line 50, delete "4. The process according to claim 1 comprising the following operations for generating said additional optical radiation: providing an additional Raman medium and generating an optical power radiation adapted to be converted by Raman effect in said additional Raman medium.".
Lines 57, 59, 62 and 65, delete "claim 4" and insert -- claim 1 --.

Column 7,
Line 11, delete "an" and insert -- a --.

Column 8,
Line 12, delete "16. The source according to claim 13, wherein said generator for generating said additional optical radiation comprises: an additional Raman medium; and a module for generating an optical power radiation adapted to be converted by Raman effect in said additional Raman medium.".
Lines 20, 22, 25 and 28, delete "claim 16" and insert -- claim 13 --.

Signed and Sealed this

Ninth Day of May, 2006

JON W. DUDAS
*Director of the United States Patent and Trademark Office*